(12) United States Patent
Cherkasova et al.

(10) Patent No.: US 8,336,054 B2
(45) Date of Patent: Dec. 18, 2012

(54) SYSTEM AND METHOD FOR ALLOCATING CAPACITY OF SHARED RESOURCES TO A WORKLOAD

(75) Inventors: Ludmila Cherkasova, Fort Collins, CO (US); Jerome Rolia, Fort Collins, CO (US); Clifford A. McCarthy, Fort Collins, CO (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1693 days.

(21) Appl. No.: 11/489,967

(22) Filed: Jul. 20, 2006

(65) Prior Publication Data
US 2008/0022284 A1 Jan. 24, 2008

(51) Int. Cl.
G06F 9/46 (2006.01)
G06F 15/173 (2006.01)
(52) U.S. Cl. .................. 718/104; 718/105; 709/226
(58) Field of Classification Search .................. None
See application file for complete search history.

(56) References Cited

U.S. PATENT DOCUMENTS

| | | | |
|---|---|---|---|
| 5,408,663 A | 4/1995 | Miller | |
| 5,598,532 A | 1/1997 | Liron | |
| 6,141,686 A | 10/2000 | Jackowski et al. | |
| 6,625,709 B2* | 9/2003 | Aiken et al. | 711/170 |
| 6,721,796 B1 | 4/2004 | Wong | |
| 6,745,221 B1 | 6/2004 | Ronca | |
| 6,845,456 B1* | 1/2005 | Menezes et al. | 713/320 |
| 6,851,030 B2* | 2/2005 | Tremaine | 711/160 |
| 6,947,987 B2* | 9/2005 | Boland | 709/226 |
| 7,096,469 B1* | 8/2006 | Kubala et al. | 718/100 |
| 7,508,763 B2* | 3/2009 | Lee | 370/235 |
| 7,665,090 B1* | 2/2010 | Tormasov et al. | 718/104 |
| 2002/0016812 A1* | 2/2002 | Uchishiba et al. | 709/104 |
| 2003/0158884 A1* | 8/2003 | Alford, Jr. | 709/104 |
| 2003/0163734 A1* | 8/2003 | Yoshimura et al. | 713/201 |
| 2005/0131982 A1* | 6/2005 | Yamasaki et al. | 709/200 |
| 2005/0160429 A1* | 7/2005 | Hameleers et al. | 718/105 |
| 2006/0206900 A1* | 9/2006 | Ooyama et al. | 718/105 |
| 2006/0262504 A1* | 11/2006 | Xia et al. | 361/700 |

OTHER PUBLICATIONS

U.S. Appl. No. 11/134,681, filed May 19, 2005.
Rolia, J. et al., "A Capacity Management Service for Resource Pools", 9 pages, 2005.
"gWLM: Reference and Additional Topics", Version A.01.01.x; Hewlett-Packard Co., May 2005, 24 pages.
"HP-UX Workload Manager User's Guide", Version A.03.01; Hewlett-Packard Co., 120 pages, 2006.

* cited by examiner

*Primary Examiner* — Meng An
*Assistant Examiner* — Abdullah Al Kawsar (57) ABSTRACT

A method comprises defining a scheduler parameter for a maximum allocation of capacity of a shared resource to a consumer for a scheduling interval. Utilization of an allocated capacity of the shared resource by the consumer during a given scheduling interval is measured, and when the allocated capacity of the shared resource is completely utilized by the consumer during the given scheduling interval, the scheduler increases the allocated capacity of the shared resource to the defined maximum allocation for the consumer for a next scheduling interval. Thus, rather than gradually increasing the allocation of capacity over many intervals, the scheduler immediately increases the allocation to a predefined maximum amount in response to an allocated amount of capacity being completely utilized during a scheduling interval.

20 Claims, 7 Drawing Sheets

40

LEGEND:
☐ = RESOURCE CONTAINER A
▨ = RESOURCE CONTAINER B
▨ = RESOURCE CONTAINER C
▨ = RESOURCE CONTAINER D

SYSTEM AND METHOD FOR ALLOCATING CAPACITY OF SHARED RESOURCES TO A WORKLOAD

CROSS-REFERENCE TO RELATED APPLICATIONS

The present application is related to concurrently filed and commonly assigned U.S. patent application Ser. No. 11/489,968 titled "SYSTEM AND METHOD FOR EVALUATING PERFORMANCE OF A WORKLOAD MANAGER", and concurrently filed and commonly assigned U.S. patent application Ser. No. 11/489,971 titled "SYSTEM AND METHOD FOR EVALUATING A WORKLOAD AND ITS IMPACT ON PERFORMANCE OF A WORKLOAD MANAGER", the disclosures of which are hereby incorporated herein by reference. The present application is also related to co-pending and commonly assigned U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," the disclosure of which is hereby incorporated herein by reference.

FIELD OF THE INVENTION

The following description relates generally to managing access to shared resources, and more specifically to systems and methods for efficiently adjusting allocation of capacity of the shared resources for servicing demands of a workload, particularly for a workload having bursty demands.

DESCRIPTION OF RELATED ART

Resource pools are collections of computing resources, such as clusters of servers, racks of blades, or other computing resources that offer shared access to computing capacity. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of resource capacity (e.g., CPU, memory, input/output). Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes, e.g., CPU, memory, I/O operation rates, and bandwidths, each with limited capacity.

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, workload managers may configure schedulers to allocate capacity of a resource pool among the consumers in an attempt to manage such allocation in a manner that provides some assurance that the consumers can satisfy their QoS goals (e.g., by balancing allocation among the consumers).

When managing resource pools, application workloads may be assigned to resource containers that are then associated with resources in the pool. Management may occur at several different timescales. Long-term management corresponds to capacity planning and takes place over many months. Over a medium-timescale, e.g. days or months, groups of resource containers are found that are expected to share resources well. These containers are then assigned to their corresponding resources. Capacity management tools can be used to automate such a process. Once resource containers are assigned to a resource, a workload manager for the resource governs access to resource capacity over short time scales, e.g. 15 seconds. A workload manager can provide static allocations of capacity or change the per-resource container allocations based on time-varying workload demand. Each resource in a pool may have a scheduler that monitors its workloads' demands and dynamically varies the allocation of capacity, e.g., CPU, to the workloads, thereby managing the utilization of the resources by the various consumers. For instance, the scheduler may dynamically vary allocation of the pool's capacity in a manner that attempts to provide each consumer with access only to the capacity it needs (for servicing its current workload). As a workload's demand increases, the scheduler may increase the amount of the resource pool's capacity that is allocated to such workload; and as a workload's demand decreases, the scheduler may decrease its allocation of the resource pool's capacity to such workload.

A workload manager may utilize several control parameters for controlling a scheduler's scheduling of resource capacity. Various schedulers are known, including without limitation proportional-share schedulers and weighted proportional-share schedulers. As these and other schedulers are well known, operation of an exemplary scheduler is only briefly described herein so as not to detract attention from the inventive concepts presented herein. The control parameters for a scheduler may include the following parameters for each workload: a gain parameter that affects how quickly the workload's allocation increases or decreases based on its current demand, a minimum CPU allocation (minCPU allocation) parameter that defines a minimum allocation of CPU for the workload even in the absence of demand, a maximum CPU allocation (maxCPU allocation) parameter that defines a maximum allocation of CPU for the workload, a lower allocation utilization threshold (lowerAllocUtil threshold) that defines a threshold amount which if the measured utilization of allocation for the workload for a previous schedule interval drops below then the allocation to the workload is decreased by the scheduler based on the gain parameter (but not below the minCPU allocation amount), and an upper allocation utilization threshold (upperAllocUtil threshold) that defines a threshold amount which if the measured utilization of allocation for the workload for a previous schedule interval exceeds then the allocation to the workload is increased by the scheduler based on the gain parameter (but not above the maxCPU allocation amount). The control parameters may be set to values that attempt to strike a balance between allocating sufficient resource capacity to a given workload to satisfy the consumer's quality of service (QoS) goals and also enabling resource capacity for satisfying the QoS desires for other workloads that share the resources. From a given consumer's point of view, having maximum capacity allocated to it may be desirable because that ensures that the consumer has the maximum capacity available from the resource pool for servicing its workload. From a resource pool manager's point of view, however, it is often desirable to limit the amount of capacity allocated to each consumer, as this allows more cost effective utilization of the pool's resources by enabling greater capacity that is available to be used by other consumers. Thus, a balance may be struck in which a certain amount of capacity is allocated to a consumer that is believed to be sufficient to satisfy the consumer's quality of service (QoS) goals, while permitting remaining capacity to be allocated to other consumers. The scheduler for a resource pool may be configured (e.g., via the above-mentioned control parameters) to manage the allocation of the resource pool's capacity to consumers in a manner that achieves such a balance in accordance with a desired resource management strategy.

Many workloads have very bursty demands. For example, client accesses of web pages over the Internet are often very bursty. For instance, a web server may go for a period of time with relatively few client accesses, and then within a short time interval a very large number of clients may access the web page (e.g., in response to a triggering news event, etc.). As mentioned above, a scheduler traditionally sets an allocation of capacity of shared resource(s) for a given consumer's demand. The scheduler monitors the consumer's demand and adjusts the allocation accordingly. That is, the scheduler may adjust the allocation of capacity to a given consumer for a given scheduling interval based on the amount of utilization of the shared resource(s) by the given consumer during a previous scheduling interval. For instance, the scheduler allocates some amount (between a predefined minCPU allocation and maxCPU allocation parameter) of CPU capacity to a consumer. If during a scheduling interval i−1, the consumer's utilization of the allocated capacity is greater than upperAllocUtil threshold, then the scheduler increases the amount of capacity allocated to the consumer for the next interval, i, by a predefined gain amount (but the allocation is not to exceed the predefined maxCPU allocation). Suppose, for instance, that minCPU allocation=0.2, maxCPU allocation=2.0, upperAllocUtil threshold=80% utilization, and gain=0.2. Further suppose that for a scheduling interval i−1 the allocation of capacity for a consumer is 0.5 CPU, and suppose that the consumer's utilization of the 0.5 CPU during the i−1 interval is 90%. Because the 90% utilization exceeds the upperAllocUtil threshold, the capacity allocated to the consumer is increased to 0.7 (i.e., increased by the gain parameter) for the next scheduling interval i.

When, as in the above example, the utilization of the allocated capacity is less than 100%, the demands of the consumer are being satisfied and the scheduler can measure to what degree the consumer is requiring to use the shared resource(s) to satisfy its demands. If, however, the utilization by the consumer during interval i−1 is 100%, then there may be demands of the consumer that are not being satisfied. Furthermore, when the utilization of the allocated capacity is 100%, the scheduler does not have a measure of the degree of resource utilization that the consumer may need to satisfy its demands. That is, when the allocated capacity is being utilized 100%, the scheduler does not know how much demand of the consumer is going unsatisfied. Thus, when increasing the allocated capacity to 0.7 for the next interval, i, the utilization may remain at 100%, and it may take many scheduling intervals to ramp the allocation of capacity up to the appropriate level for satisfying the consumer's demand (or to the maxCPU allocation amount if the consumer's demands exceed such maxCPU allocation amount), which may result in poor quality of service to the consumer. Thus, traditional scheduling schemes are particularly problematic for unpredictable or bursty workloads.

DETAILED DESCRIPTION

Figure 1:
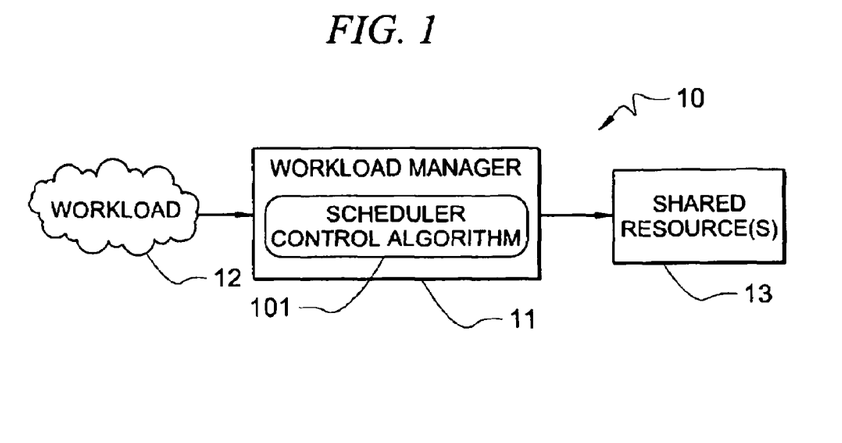
FIG. 1 shows an exemplary system according to one embodiment of the present invention.

FIG. 1 shows an exemplary system 10 according to one embodiment of the present invention. As shown, system 10 includes a workload manager 11 that is operable to manage access by workload 12 (e.g., application workloads) to capacity of shared resources 13, which may be resources in a resource pool. Shared resources 13 may be any type of computing resource that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Such shared resources 13 have capacity attributes, e.g., CPU, memory, I/O operation rates, and bandwidths, each with limited capacity. Thus, workload manager 11 manages access of competing consumer workloads 12 to such limited resource capacity. That is, workload manager 11 manages access to shared resource(s) 13 for satisfying competing demands of workload(s) 12 for capacity of the shared resource(s) 13. In so doing, workload manager 11 may define control parameters for a scheduler, such as a proportional-share scheduler, which dictate a scheduling scheme to be employed by such scheduler for scheduling access by competing consumer workloads to the shared resources 13. In certain embodiments, the scheduling scheme may be a dynamic scheme that varies depending on the respective demands of the competing workloads. In other embodiments, the scheduling scheme may be static.

According to embodiments of the present invention, workload manager 11 employs a scheduler control algorithm 101 that efficiently manages allocation of shared resource(s) 13 for workload 12. As described herein, workload manager 11 may (in accordance with scheduler control algorithm 101) dynamically change the allocation of capacity of shared resource(s) 13 to competing consumers based on the consumers' demands in workload 12. As described further herein, such scheduler control algorithm 101 is particularly efficient for managing allocation of shared resource(s) 13 for a workload 12 that comprises bursty demands. In general, "burstiness" of a workload refers to the amount of change in demand that occurs over short intervals of time (e.g., from one scheduling interval to a next scheduling interval). Thus, the larger a change in demand during such a short interval, the more bursty the workload is considered. Accordingly, in certain embodiments, the workload's burstiness corresponds to the degree to which demand for capacity of a shared resource varies from one scheduling interval to the next.

According to certain embodiments, scheduler control algorithm 101 allocates a predefined maximum amount of capacity to a consumer in response to the consumer's utilization of an allocated capacity being completely utilized. That is, if during a first scheduling interval a consumer utilizes 100% of capacity allocated to the consumer by the workload manager 11, then the scheduler control algorithm 101 increases the allocated capacity to a predefined maximum amount for the consumer for the next scheduling interval. Thus, rather than gradually increasing the allocation of capacity little by little (e.g., by a predefined gain parameter), in certain embodiments of the present invention the scheduler control algorithm 101 immediately increases the allocation to a predefined maximum amount (e.g., to maxCPU allocation) in response to an allocated amount of capacity being completely utilized during a scheduling interval. As described further herein, this scheduling scheme is particularly advantageous for bursty workloads.

Workload 12 may be an actual workload that is being managed by a workload manager 11. Alternatively, in certain embodiments, workload 12 is an expected (e.g., historical, simulated, etc.) workload 12 for a given system. That is, workload 12 may be a representative workload of consumer(s) in a given system, which may be an actual historical workload collected for the consumer(s) or a synthetic workload generated to represent the workload of the consumer(s), as examples. Workload(s) 12 includes competing demands for access to shared resource(s) 13. In one embodiment, workload 12 includes data identifying various time periods and the corresponding demands for resource access (e.g., CPU utilization) desired by a consumer. For instance, workload 12 may comprise a sequence of timestamps (which may be 5 seconds apart, 5 minutes apart, etc., depending on the appropriate time granularity for the environment/resource) and the corresponding resource utilization (e.g., CPU, I/O, network, or other resource utilization) for each timestamp. Such workload 12 thus provides an estimation of the future workload expected for the consumer(s) of the system under evaluation. For instance, a historical workload of, say, 3 months of usage of the system's consumers, may provide a good estimation of a future workload expected to be incurred by the consumers. Thus, workload 12 comprises a plurality of competing workloads demanding access to the shared resource(s) 13 over time. In certain embodiments, workload manager 11 may be a simulated model of a workload manager under evaluation.

Workload manager 11 and/or scheduler control algorithm 101 may be a software program stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of workload manager 11 and/or scheduler control algorithm 101 may be implemented in software, hardware, firmware, or any combination thereof. Thus, workload manager 11 and/or scheduler control algorithm 101 may be employed as any type of evaluation logic, whether software, hardware, firmware, or any combination thereof.

Figure 2:
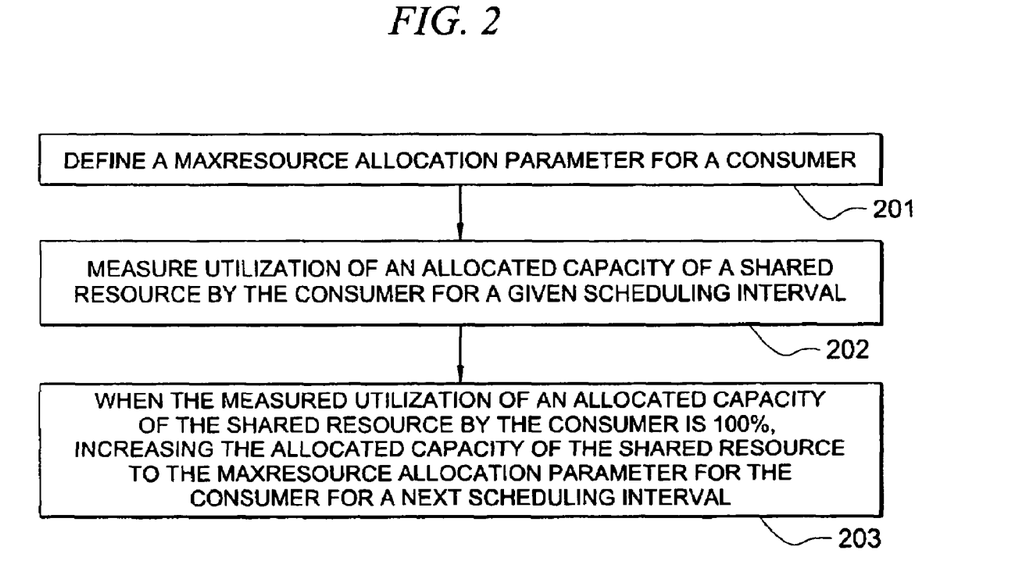
FIG. 2 shows an operational flow diagram for reallocating capacity of a shared resource for servicing a consumer's demand according to certain embodiments of the present invention.

FIG. 2 shows an operational flow diagram for managing allocation of capacity of a shared resource(s) 13 to a workload 12 according to certain embodiments of the present invention. That is, scheduler control algorithm 101 may, in certain embodiments, operate according to the exemplary operational flow of FIG. 2. In operational block 201, a maxResource allocation parameter is defined for a consumer. The maxResource allocation parameter defines a maximum amount of capacity of the shared resource(s) 13 that may be allocated to the consumer's demands in workload 12 during any given scheduling interval. In certain embodiments, the maxResource allocation parameter may be a maxCPU allocation parameter.

In operational block 202, an amount of utilization of an allocated capacity of shared resource(s) by the consumer during a given scheduling interval is measured. Such measurement of utilization may be performed using any utilization measurement tool (e.g., application) now known or later developed.

In operational block 203, when the measured utilization of the allocated capacity of the shared resource by the consumer is 100% (i.e., the allocated capacity is completely utilized during the given scheduling interval), the scheduler (e.g., workload manager 11) increases the allocated capacity of the shared resource(s) 13 to the maxResource allocation parameter for the consumer for a next scheduling interval.

In certain embodiments, resource pools provide computing environments that offer virtualized access to shared resources, such as shared resources 13 of FIG. 1. Using the shared resources 13 of a pool effectively can rely on a combination of workload placement and workload management technologies. Workload management generally governs short-term access to resource capacity. For example, workload management may provide performance isolation within resource pools to ensure resource sharing even under high loads.

A workload manager, such as workload manager 11 of FIG. 1, can have a direct impact both on an application's overall resource access quality of service and on the number of workloads that can be assigned to a pool.

Before describing embodiments of the present invention further, a brief description of an exemplary system to which embodiments of the present invention pertain is appropriate. Thus, an exemplary system for which embodiments of the present invention may be employed is described below with FIGS. 3-4. Such embodiments are merely exemplary for illustration of application of the concepts presented herein, and application of the concepts of the present invention are not intended to be limited to such exemplary embodiments. For instance, while an exemplary proportional-share scheduler and its corresponding control parameters are described below, embodiments of the present invention are applicable to a broader class of workload managers that are based on proportional-share schedulers. Thus, the exemplary proportional-share scheduler implementation described herein provides a basis for discussion of various concepts of the present invention, which those of ordinary skill in the art will readily appreciate may be likewise employed for application to other types of proportional-share schedulers.

Figure 3:
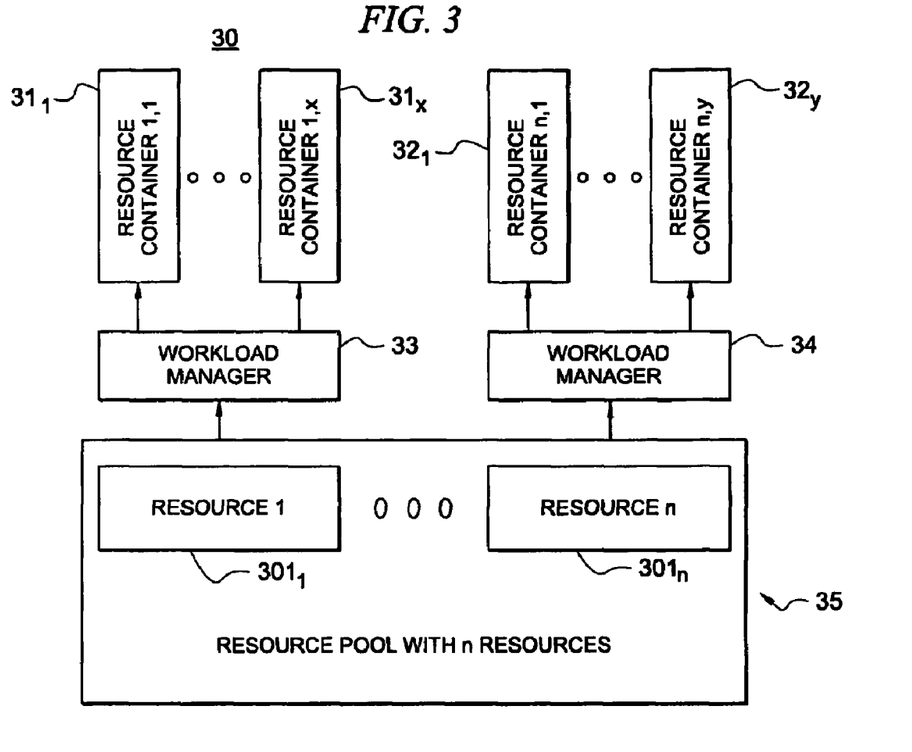
FIG. 3 shows an exemplary system illustrating the relationship between resource containers, workload managers, resources, and a resource pool according to one embodiment of the present invention.

FIG. 3 shows an exemplary system 30 illustrating the relationship between resource containers, workload managers, resources, and a resource pool according to one embodiment of the present invention. System 30 reflects an architecture commonly used for managing access to shared resources, such as is employed by the gWLM and WLM products available from Hewlett Packard Development Company, L.P. System 30 includes a resource pool 35 that includes a collection of resources $301_1$-$301_N$ (where N is any number), collectively referred to as resources 301. Such resources 301 may be any type of computing resources, such as clusters of servers or racks of blades, that offer shared access to computing capacity.

System 30 also includes resource containers $31_1$-$31_X$ (where X is any number), collectively referred to as resource containers 31, and resource containers $32_1$-$32_Y$ (where Y is any number), collectively referred to as resource containers 32. Resource containers 31 and 32 may be, as an example, virtual machines that are provided with access to shares of resource capacity (e.g., CPU, memory, input-output) via a scheduling scheme managed by workload managers 33 and 34, respectively. That is, in this example, workload manager 33 manages the scheduling of access by the workloads of resource containers 31 to the associated resources in pool 35, while workload manager 34 manages the scheduling of access by the workloads of resource containers 32 to the associated resources in pool 35. While two workload managers 33 and 34 with respective resource containers 31 and 32 are shown for ease of illustration in this example, those of ordinary skill in the art will recognize that any number of such workload managers may be so implemented in system 30. Further, any number of resource pools each comprising any number of resources therein may be employed in a given implementation of system 30. Additionally, any scheduling scheme now known or later developed may be employed by workload managers 33 and 34, such as employing known proportional-share schedulers or weighted proportional-share schedulers.

In this example, when managing a resource pool 35, application workloads are assigned to resource containers 31, 32 that are associated with resources 301 in the pool. For instance, in this example resource containers 31 are associated with resource(s) $301_1$, and resource containers 32 are associated with resource(s) $301_N$. In other words, the workloads assigned to resource container 31 are requesting access to certain resources $301_1$ that are pre-associated with resource container 31, and the workloads assigned to resource container 32 are requesting access to certain resources $301_N$ that are pre-associated with resource container 32. Thus, each of resource containers $31_1$-$31_X$ correspond to a separate workload that is competing for access to shared resource $301_1$.

Generally, management of the resource pool 35 may occur at several different timescales. Long-term management typically corresponds to capacity planning and may take place over several months. Over a medium timescale, e.g., days or months, groups of resource containers, such as containers 31 and 32 in FIG. 3, are found that are expected to share resources well. These containers are then assigned to their corresponding resources. For instance, resource containers 31 share access to resource(s) $301_1$, while resource containers 32 share access to resource(s) $301_N$ in this example. Capacity management tools can be used to automate such a process, or the assignment of containers to resources may be performed manually. Techniques now known or later developed may be employed for assigning workloads to a resource container and/or for associating resources with a container, and such techniques are thus not described further herein so as not to detract attention from the inventive concepts presented herein.

Once resource containers are assigned to a resource, a workload manager for the resource governs access to resource capacity over short timescales, e.g., 15 seconds or similar time intervals. Thus, workload manager 33 governs (or manages) access of workloads in containers 31 to computing capacity of resource $301_1$, while workload manager 34 governs (or manages) access of workloads in containers 32 to computing capacity of resource $301_N$, in this example. Each workload manager can provide static allocations of capacity or change the per resource container allocations based on time-varying workload demand.

Each resource container is associated with an entitled number of shares of an associated resource. For example, each of resource containers $31_1$-$31_X$ may be associated with an entitled number of shares of a CPU resource(s) $301_1$. The entitled number of shares correspond to an upper bound on the allocation of resources for the container. Workload manager 33 dynamically varies the allocation of shares to each resource container $31_1$-$31_X$ to permit a more efficient use of the shared resource(s) $301_1$. In one embodiment, the workload manager is layered upon a proportional-share scheduler. An exemplary implementation of a proportional-share scheduler is described hereafter for illustrative purposes.

Figure 4:
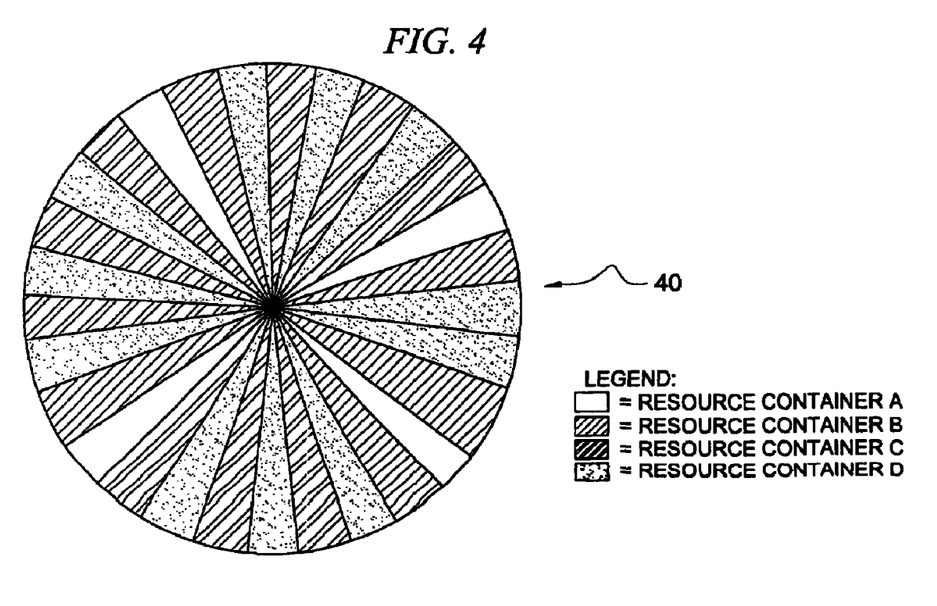
FIG. 4 shows an exemplary pie chart that illustrates a schedule for a proportional-share scheduler that supports several resource containers, according to one embodiment of the present invention.

The proportional-share scheduler utilized in one embodiment provides bounded access to resources for each resource container. The scheduler is configured to offer a share of a resource (e.g., a CPU resource). For instance, the scheduler may be configured to offer 10 millisecond (msec) CPU timeslices. Of course, timeslices may be offered according to some other time interval. FIG. 4 shows an exemplary pie chart 40 that illustrates a schedule for such a proportional-share scheduler that supports several resource containers, identified as resource containers "A", "B", "C", and "D", according to one embodiment of the present invention. Resource containers A-D may correspond to resource containers 31 or to resource containers 32 of FIG. 3, as examples. Each piece of the pie represents one timeslice. Similarly shaded slices correspond to the same resource container, as indicated in the accompanying legend of FIG. 4. With bounded access, the scheduler advances from slice to slice every 10 msec regardless of whether resources are used or not, i.e. it is a non-work-conserving scheduler. This provides for performance isolation. Each container receives its particular service rate regardless of whether any of the containers are using resources (i.e., regardless of the workload demands). Such isolation can be desirable in a shared resource environment for enterprise applications as it gives the appearance of dedicated access to resources. Adding new workloads (with corresponding new containers) to the pool has little impact on the performance behavior of workloads already in the pool.

The schedule is chosen to provide each resource container with access to its allocated shares. In this example, the scheduler spreads each resource container's shares as evenly as possible over the pie to deliver what may be perceived as a smooth service rate. Though the pie 40 illustrates a schedule for access to one CPU, a workload may be assigned shares from many CPUs (or other types of shared resources) such that its total allocation equals its number of shares. Workload schedulers may use heuristics to best match the offered concurrency over all CPUs with the level of concurrency a workload is able to exploit. However, when more CPUs are used, the service rate per-CPU diminishes and the per-CPU schedules may differ. In this exemplary embodiment, no assumption is made about whether the schedules for multiple CPUs are synchronized.

An inherent problem of a fixed schedule, i.e., fixed allocations, is that resources may not be used as efficiently as desired. In such an implementation, each resource container is sized to support its peak capacity requirements. That is, each resource container is allocated sufficient number of CPU timeslices to support its peak capacity requirements. Yet, most applications rarely need their peak amount. Workload managers aim to dynamically allocate the capacity associated with resource containers to facilitate resource sharing. As mentioned above, the workload manager (e.g., workload managers 33 and 34 of FIG. 3) considered in one exemplary embodiment is layered on top of a proportional-share scheduler and dynamically adjusts the allocation of each resource container based upon the current demands of the resource container. For example, if a workload of a given resource container goes idle, then its allocation can be reduced (e.g., the number of timeslices allocated to such container in pie 40 of FIG. 4 may be reduced); and if the workload becomes very busy, then its allocation can be increased (e.g., the number of timeslices allocated to such container in pie 40 of FIG. 4 may be increased). The workload manager may define control parameters that control such dynamic reallocation by the scheduler, as discussed further below.

Adjusting the allocation of resource capacity to containers based on demand permits statistical multiplexing within a resource pool. For ease of discussion, such multiplexing is not considered in this embodiment. Analysis of this exemplary embodiment of a scheduler assumes that each workload gets access to capacity according to its demands and the allocation decisions of the workload manager algorithm. The analysis is with respect to a workload within its resource container.

The workload managers 33 and 34 considered in this exemplary embodiment each corresponds to a negative feedback controller. Each workload manager has several control parameters, including the following control parameters:

schedule interval is a parameter that is applied for all workloads managed by the workload manager. The workload manager computes a new schedule for the proportional-share scheduler at the end of each schedule interval;

gain—a parameter that affects how quickly a workload's allocation increases or decreases based on its current demand;

minCPU allocation—a minimum allocation amount, i.e. even in the absence of demand, the allocation cannot go lower than minCPU amount;

maxCPU allocation—maximum allocation amount for the workload;

lowerAllocUtil threshold—a parameter that triggers a decrease of the allocation, i.e. if the measured utilization of allocation for a workload for the previous schedule interval drops below the lower AllocUtil value, then the allocation is decreased based on the gain value, but it never goes below the minCPU allocation amount; and upperAllocUtil threshold—a parameter that triggers an increase of the allocation, i.e. if a utilization of allocation goes above the upperAllocUtil then the allocation is increased based on the gain value, but it can not go higher than maxCPU allocation amount.

In operation of this exemplary scheduler, the allocation (e.g., of CPU timeslices to a given workload) does not change when utilization of allocation for such workload falls within the range lowerAllocUtil and upperAllocUtil. Further, the allocation never goes out of the range minCPU allocation and maxCPU allocation. These conditions help to avoid hysteresis, limit the impact of one workload on others, and ensure resource access quality of service when a workload is transitioning from an idle to busy period. Note that for this exemplary embodiment: $0 \leq \text{lowerAllocUtil} \leq \text{upperAllocUtil} \leq 1$. In other words, $0\% \text{ utilization} \leq \text{lowerAllocUtil} \leq \text{upperAllocUtil} \leq 100\% \text{ utilization}$. It should be further noted that while this exemplary embodiment is described for a CPU resource, the concepts may be likewise applied to other shared resources. Thus, for instance, the minCPU allocation and maxCPU allocation parameters may be referred to generically as "minResource allocation" and "maxResource allocation" for defining the minimum and maximum allocation amounts of any shared resource.

To describe aspects of the schedule control algorithm according to one embodiment in a more formal way, we use the following notation:

i—the current time interval;

$D_i^{new}$—a new incoming workload demand in interval i; and $D_i^{carry\_forw}$ the portion of demand that that was not satisfied in interval i−1 and is therefore carried forward to interval i. For each time interval, $D_i^{carry\_forw}$ is computed according to the following formula: $D_i^{carry\_forw} = \max(D_{i-1} - A_{i-1}, 0)$;

$D_i$—the total demand in interval i, where $D_i = D_i^{new} + D_i^{carry\_forw}$; and $A_i$—the allocation provided by the controller in time interval i.

At the end of interval i, the workload manager computes a new allocation $A_{i+1}$ for the workload for interval i+1 using the following policies:

1. If $\text{lowerAllocUtil} \leq D_i/A_i \leq \text{upperAllocUtil}$ then there is no change in the allocation, and $A_{i+1} = A_i$.

2. If $D_i/A_i \leq \text{lowerAllocUtil}$ then the controller attempts to decrease the next interval allocation:

$$A_{i+1} = A_i - \text{gain} \times \left(A_i - \frac{D_i}{lowerAllocUtil}\right).$$

If $A_{i+1} \leq \text{minCPU}$ then $A_{i+1} = \text{minCPU}$

3. If $\text{upperAllocUtil} \leq D_i/A_i$ then the controller attempts to increase the next step allocation:

$$A_{i+1} = A_i + \text{gain} \times \left(\frac{D_i}{upperAllocUtil} - A_i\right).$$

If $\text{maxCPU} \leq A_{i+1}$ then $A_{i+1} = \text{maxCPU}$

The workload manager takes the computed allocations for each workload's resource container and associates them with a schedule, i.e., for time interval i+1. The proportional-share scheduler then serves short timeslices, such as those shown in FIG. 4, according to the schedule until the end of the interval.

Since allocation can not go lower than minCPU amount it may be tempting to set such an allocation to a very small value. However, in this case, it may take several schedule intervals to increase an allocation to a correct size when there is a burst of incoming demand. This may present a resource access quality of service issue for interactive workloads with infrequent bursts of requests as the requests that start the bursts may incur long response times.

The choice of lower and upper utilization of allocation thresholds is based on the responsiveness requirements and arrival process of a workload. The greater the burstiness in arrivals, and the greater the responsiveness requirements, the lower the acceptable utilization of allocation. This is because utilization of allocation is measured over an interval, e.g., 15 seconds, so it conceals the bursts of demand within the interval. For this reason resource allocations are typically larger than resource demands. This limits the potential utilization of resources in a resource pool.

Since allocation cannot go lower than minCPU amount, it may be tempting to set such an allocation to a very small value. However, in this case, it may take several schedule intervals to increase an allocation to a correct size when there is a burst of incoming demand. This may present a resource access quality of service issue for interactive workloads with infrequent bursts of requests, as the requests that start the bursts may incur long response times before the scheduler properly reallocates the shared resource capacity over many scheduling intervals.

The choice of lower and upper utilization of allocation thresholds is based on the responsiveness requirements and arrival process of a workload. The greater the burstiness in arrivals, and the greater the responsiveness requirements, the lower the acceptable utilization of allocation. This is because utilization of allocation is measured over an interval, e.g., 15 seconds, so it conceals the bursts of demand within the interval. For this reason, resource allocations are typically larger than resource demands. This limits the potential utilization of resources in a resource pool. Accordingly, understanding the burstiness of an expected workload may aid in determining the appropriate parameter settings of a workload manager to enable provision of a desired QoS while maintaining efficient resource utilization (i.e., minimizing any unnecessary over-allocation of resource capacity).

Determining an appropriate utilization of allocation range can be either a categorical or empirical exercise. A categorical approach could consider several classes of service, each associated with a range. Each workload may be assigned to one of the classes based on business need. The highest quality class may represent business critical where high response times may affect the revenue or image of the business. The lowest class may be for workloads where higher response times have no significant business impact. An exemplary technique for determining different classes of service to be assigned to the competing workloads is described further in co-pending and commonly assigned U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," the disclosure of which is hereby incorporated herein by reference. An empirical exercise for a specific application would look at its arrival and service time processes to determine a utilization of allocation range that satisfies application-specific response time requirements.

As discussed further in co-pending and commonly assigned U.S. patent application Ser. No. 11/489,968 titled "SYSTEM AND METHOD FOR EVALUATING PERFORMANCE OF A WORKLOAD MANAGER", the disclosure of which is incorporated herein by reference, in certain embodiments a workload manager evaluation metric may be used for evaluating a workload manager's performance (e.g., performance of workload manager 11 of FIG. 1), such as for measuring resource usage efficiency and resource access QoS. According to one embodiment, such a workload manager evaluation metric may be determined as described further hereafter. That is, according to one embodiment, exemplary metrics for measuring resource access quality of service are defined. In this embodiment, the operational measures, such as measurement of resource usage efficiency and resource access QoS, are computed by a workload manager evaluator over a representative time period for a workload's demands, e.g., hours or months. Such a workload manager evaluator may be a software program stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of the workload evaluator may be implemented in software, hardware, firmware, or any combination thereof.

According to one embodiment, the below-described metrics for measuring usage efficiency and resource access quality of service are defined. These are operational measures that are computed over a representative time period for a workload's demands, e.g., hours or months. The metrics are described further in co-pending and commonly assigned U.S. patent application Ser. No. 11/489,968 titled "SYSTEM AND METHOD FOR EVALUATING PERFORMANCE OF A WORKLOAD MANAGER", the disclosure of which is incorporated herein by reference.

The original workload and its demands are characterized as a trace of CPU demand values for the time period, with one CPU demand value per schedule interval. Values are computed for the metrics with respect to a particular set of workload manager control parameters by replaying the trace through the simulation model of workload manager control algorithm.

To facilitate the comparison of alternative parameter settings the metrics are normalized with respect to a reference system. The reference system is assumed to have a fixed capacity, i.e., its allocation does not change over time. In a reference system with N CPUs, all N CPUs are statically allocated to workload for all time intervals. We denote this reference capacity as allocation Aref.

Consider a trace of demands $D_i^{new}$ for intervals i=1, . . . ,T for a trace with T demand measurements. Let $A_i$ be the CPU allocation for interval i as it is computed by the workload manager control algorithm.

Usage efficiency U is defined as a workload's average allocation with respect to the reference system's capacity:

$$U = \frac{\left(\sum_{i=1}^{i=T} A_i\right)/T}{A_{ref}}.$$

A lower value for U corresponds to a lower usage of the reference capacity and hence leads to greater efficiency because the unused resources can be used by other workloads.

Resource access quality of service (QoS) is represented using the metric QoS satisfied demand $D^{QoS}$. This is the portion of total demand that is satisfied in intervals that have utilization of allocation less than or equal to upperAllocUtil. In one embodiment, $D^{QoS}$ may be defined as follows:

$$D^{QoS} = \sum_{i=1}^{i=T} D_i, \text{ such that } \frac{D_i}{A_i} \leq upperAllocUtil.$$

It should be noted that $D_i$ includes carry forward demand $D_i^{carry\_forw}$, since $D_i = D_i^{new} + D_i^{carry\_forw}$ as described above. The quicker the workload manager controller adapts to provide the correct allocation, the higher fraction of the carried forward demand might be QoS satisfied demand.

Intuitively, the reference system helps to set the QoS expectations. Since its allocation does not change over time and it always allocates the maximum capacity of the reference system, it shows what fraction of workload demands can be QoS satisfied under its maximum possible capacity allocation.

To facilitate comparison with the reference system (and in such a way, between different systems), in one embodiment the QoS satisfied demand that corresponds to a workload control parameter configuration scenario, $D^{QoS}$, is normalized with respect to the QoS satisfied demand of the reference system, $D_{ref}^{QoS}$. This normalization characterizes the portion of demand that is QoS satisfied demand with respect to the reference system. In this embodiment, we refer to this as normalized QoS satisfied demand $Q^D$, which is defined as:

$$Q^D = \frac{D^{QoS}}{D_{ref}^{QoS}}.$$

When $Q^D=1$, the amount of QoS satisfied demand is the same as was measured for the reference system. For systems with higher capacity than the reference system, $Q^D$ can be greater than 1, meaning that the amount of QoS satisfied demand is higher than for the reference system.

In certain embodiments, a metric Satisfied Demand $S^D$ is also defined. This $S^D$ metric is the portion of total demand that is satisfied in intervals where the demand is less than or equal to the allocation:

$$S^D = \frac{\sum_{i=0}^{i=T} D_i}{D}$$

such that $D_i \leq A_i$, where D is the sum of demands $D_i^{new}$ new over the T time intervals.

In certain embodiments, for the metrics $Q^D$ and $S^D$ the percentage of the time intervals that satisfy the respective requirements is tracked as metrics $Q^P$ and $S^P$, respectively. These metrics bring additional perception of time for characterizing resource access quality of service. For example, the $Q^P$ metric reflects the percentage of time intervals (amount of time) during which QoS satisfied access to CPU capacity is provided. In one embodiment, these metrics have values between 0 and 1, and are not normalized.

In general, metrics from within an application's context, such as response times, are hard to obtain. Thus, in certain embodiments, the resource usage based metrics are used as measures of application workload quality of service. The metrics may be used to determine how well the workload manager under evaluation is providing access to capacity of a shared resource in proportion to a workload's needs/demands.

A $Q^D$ value can be associated with each class of service offered by the resource pool. In some sense, the $Q^D$ value reflects how quickly the workload manager reacts to changing loads. When $Q^D<1$, then a lower percentage of demand is being satisfied in the intervals with utilization of allocation less than upperAllocUtil than for the reference system. When $Q^D>1$, it suggests that more demand is being satisfied in such intervals than for the reference system.

According to certain embodiments of the present invention, a scheduling scheme that may be referred to as "fast allocation policy" is implemented by scheduler control algorithm 101. Such a scheduling scheme according to one embodiment is now described.

In this exemplary embodiment, the sum of minCPU allocation values over all resource containers must be less than the capacity of the resource pool. Large minCPU allocation values may present an unintended limit on the number of workloads that can be associated with a shared resource pool whether or not the pool is heavily utilized.

Thus, in this embodiment an exemplary method is provided to reduce the required minCPU allocation parameter value while maintaining normalized QoS satisfied demand $Q^D$ and usage efficiency U. The exemplary method modifies the above-described traditional workload manager control algorithm slightly, and again such modification may be referred to as a fast allocation policy. Such modification improves $Q^D$ by increasing the allocation to maxCPU allocation whenever the allocation is observed to be fully utilized. When the allocation is fully utilized during a scheduling interval, then the true extent of demand is not known to the control algorithm. This exemplary implementation of a fast allocation policy is an aggressive action for reacting to large changes in demand.

To implement the fast allocation policy, we modify policy 3 of the controller algorithm (see Section 2) in the following way:

If upperAllocUtil<$D_i/A_i$ then the controller attempts to increase the next step allocation:
1. If $D_i<A_i$ then $$A_i + 1 = A_i + gain \times (\frac{D_i}{upperAllocUtil} - A_i)$$

If maxCPU<$A_{i+1}$ the $A_{i+1}$=maxCPU
2. If $A_i \leq D_i$ then $A_{i+1}$=maxCPU If the demand $D_i$ is less than the assigned allocation (and hence the observed utilization of allocation is less than 100%), the fast allocation policy behaves in the same way as the original algorithm. Otherwise it increases the allocation to maxCPU as it is not known what the true demand is. With the original algorithm, it may take several intervals before the allocation is well matched with the true demand. With the fast allocation policy, the maximum entitled capacity is allocated in a single step. The new algorithm is therefore less efficient in its use of resources as it may take additional steps before the allocation is reduced to meet the workload's true demand. However it typically provides a better quality of service for the workload.

Figure 5:
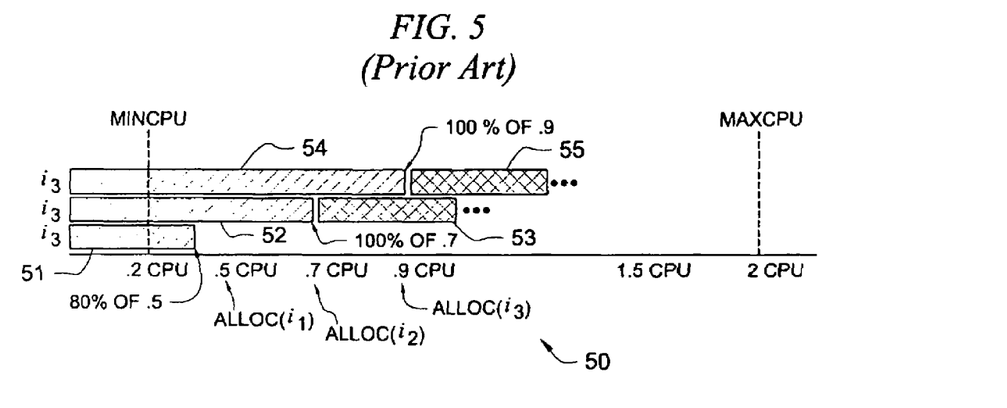
FIG. 5 shows an exemplary illustration of a scheduling scheme employed by traditional schedulers.

Turning to FIG. 5, an exemplary scheduling scheme 50 of a traditional scheduler is shown. In this example, the minCPU allocation parameter is set to 0.2 CPU, the maxCPU allocation parameter is set to 2 CPU, upperAllocUtil is set to 70% utilization, and gain is set to 0.2. In the illustrated example, three scheduling intervals $i_1$-$i_3$ are shown with corresponding bars illustrating amount of utilization of the capacity of the shared resource (e.g., CPU in this example) allocated to the corresponding consumer. In the first scheduling interval, $i_1$, the scheduler has allocated 0.5 CPU to the consumer (i.e., Alloc($i_1$)=0.5), and the consumer's utilization of this allocated capacity (shown by bar 51) is 80% of the 0.5 CPU.

Thus, because the utilization of the allocated capacity in first interval $i_1$ exceeds upperAllocUtil (i.e., 80%>70%), then the scheduler increases the capacity allocated to the consumer for the next scheduling interval by gain. Accordingly, for scheduling interval $i_2$, 0.7 CPU is allocated to the consumer (i.e., Alloc($i_2$)=0.7). The consumer's utilization of the allocated capacity in interval $i_2$ (shown by bar 52) is 100% of the 0.7 CPU. Because the allocated capacity is completely utilized, there may exist some amount of demand (illustrated by bar 53) by the consumer which is unknown to the scheduler.

Because the utilization of the allocated capacity in second interval $i_2$ exceeds upperAllocUtil (i.e., 100%>70%), then the scheduler again increases the capacity allocated to the consumer for the next scheduling interval by gain. Accordingly, for scheduling interval $i_3$, 0.9 CPU is allocated to the consumer (i.e., Alloc($i_3$)=0.9). The consumer's utilization of the allocated capacity in interval $i_3$ (shown by bar 54) is 100% of the 0.9 CPU. Again, because the allocated capacity is completely utilized, there may exist some amount of demand (illustrated by bar 55) by the consumer which is unknown to the scheduler.

As can be seen by the above example, it may take several scheduling intervals for the scheduler to adapt the allocated resource capacity to an appropriate amount for the consumer's demand. Thus, this is particularly problematic and insufficiently responsive for bursty workloads.

Figure 6:
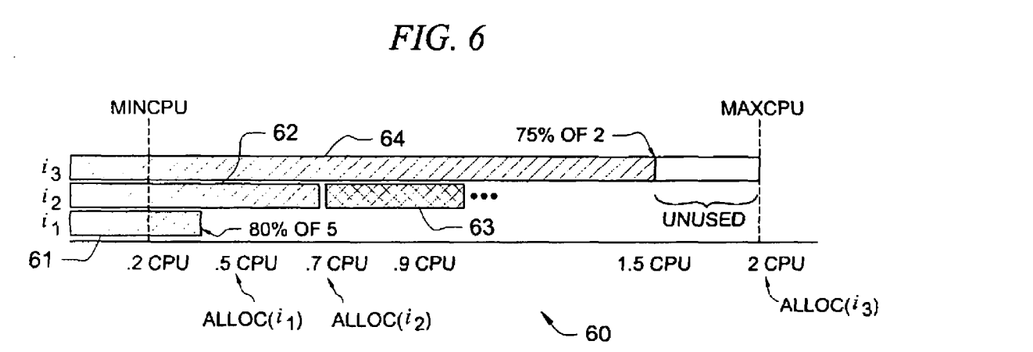
FIG. 6 shows an exemplary illustration of a scheduling scheme employed by a scheduler according to one embodiment of the present invention.

Turning now to FIG. 6, an exemplary scheduling scheme 60 according to one embodiment of the present invention is shown. As in the exemplary scheme 50 described with FIG. 5, in this example, the minCPU allocation parameter is set to 0.2 CPU, the maxCPU allocation parameter is set to 2 CPU, upperAllocUtil is set to 70% utilization, and gain is set to 0.2. In the illustrated example, three scheduling intervals $i_1$-$i_3$ are again shown with corresponding bars illustrating amount of utilization of the capacity of the shared resource (e.g., CPU in this example) allocated to the corresponding consumer. In the first scheduling interval, $i_1$, the scheduler has allocated 0.5 CPU to the consumer (i.e., Alloc($i_1$)=0.5), and the consumer's utilization of this allocated capacity (shown by bar 61) is 80% of the 0.5 CPU.

Thus, because the utilization of the allocated capacity in first interval $i_1$ exceeds upperAllocUtil (i.e., 80%>70%), then the scheduler increases the capacity allocated to the consumer for the next scheduling interval by gain. Accordingly, for scheduling interval $i_2$, 0.7 CPU is allocated to the consumer (i.e., Alloc($i_2$)=0.7). This operation is the same as in the exemplary scheme 50 of FIG. 5.

The consumer's utilization of the allocated capacity in interval $i_2$ (shown by bar 62) is 100% of the 0.7 CPU. Because the allocated capacity is completely utilized, there may exist some amount of demand (illustrated by bar 63) by the consumer which is unknown to the scheduler.

In this exemplary embodiment, because the utilization of the allocated capacity is 100% (i.e., completely utilized) in second interval $i_2$, the scheduler increases the capacity allocated to the consumer for the next scheduling interval to maxCPU allocation, which is 2 CPU in this example. Accordingly, for scheduling interval $i_3$, 2 CPU is allocated to the consumer (i.e., Alloc($i_3$)=2). The consumer's utilization of the allocated capacity in interval $i_3$ (shown by bar 64) is 75% of the 2 CPU. In this case, the 75% utilization is above the upperAllocUtil parameter, but because the allocated capacity is at the maxCPU allocation, it will not be increased further. In this example, the demand of the consumer becomes visible (or measurable) by the scheduler in interval $i_3$, as opposed to remaining unknown in interval $i_3$ of the scheduling scheme of FIG. 5. Of course, even if the demand is so great in interval $i_3$ that 100% of the allocation 2 CPU capacity is utilized, the scheduler has at least quickly responded by immediately increasing the allocated CPU for the consumer to the maxCPU allocation (2 CPU), thus providing the optimal quality of service available for the consumer.

Figure 7:
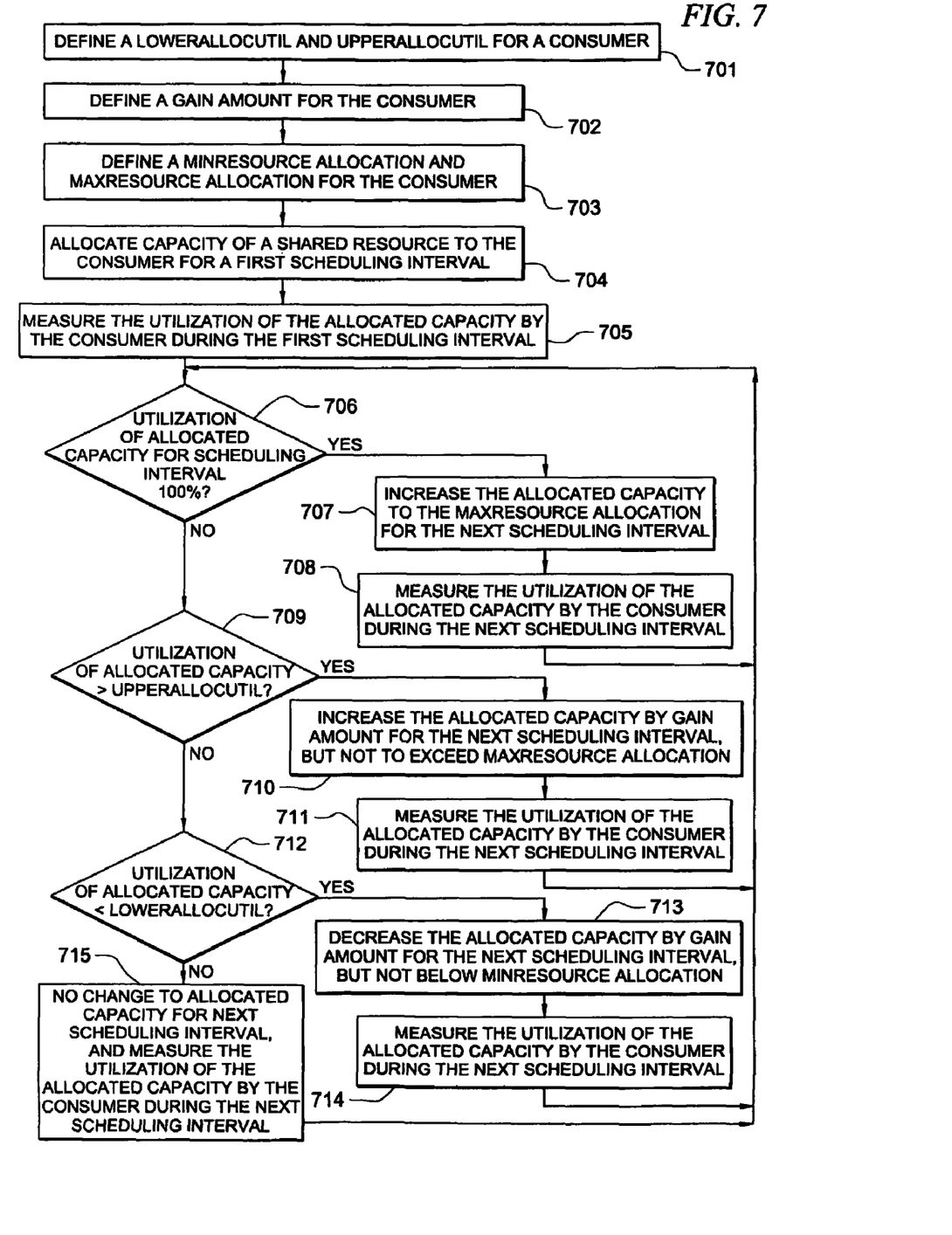
FIG. 7 shows an exemplary operational flow according to one embodiment of the present invention.

FIG. 7 shows an exemplary operational flow of a scheduler (e.g., scheduler control algorithm 101 of FIG. 1) according to one embodiment of the present invention. In operational block 701, lowerAllocUtil and upperAllocUtil parameters are defined for a consumer. A user may set these parameters, for example. In operational block 702, a gain parameter is defined for the consumer. For instance, in the above example of FIG. 6, the gain parameter is set to 0.2. In block 703, a minResource allocation and maxResource allocation parameter (e.g., minCPU allocation and maxCPU allocation) are defined for the consumer.

In operational block 704, a scheduler allocates capacity of a shared resource (e.g., shared resource 13 of FIG. 1) to the consumer for a first scheduling interval. In block 705, the scheduler measures the utilization of the allocated capacity by the consumer during the first scheduling interval. For instance, in the above example of FIG. 6, in a first interval $i_1$, the consumer is allocated 0.5 CPU and the measured utilization of the allocated capacity is 80%.

In block 706, the scheduler determines whether the utilization of the allocated capacity for this scheduling interval is 100%. If so, then operation advances to block 707 where the scheduler increases the allocated capacity to the maxResource allocation for the next scheduling interval. Then, in block 708, the scheduler measures the utilization of the allocated capacity by the consumer during the next scheduling interval, and operation returns to block 706.

If in block 706, the scheduler determines that the utilization of the allocated capacity for the scheduling interval is not 100%, the operation advances to block 709 where the scheduler determines whether the utilization of the allocated capacity for this scheduling interval exceeds the upperAllocUtil. If so, then operation advances to block 710 where the scheduler increases the allocated capacity by the defined gain amount, but not to exceed the defined maxResource allocation amount, for the next scheduling interval. Then, in block 711, the scheduler measures the utilization of the allocated capacity by the consumer during the next scheduling interval, and operation returns to block 706.

If in block 709, the scheduler determines that the utilization of the allocated capacity for the scheduling interval does not exceed upperAllocUtil, the operation advances to block 712 where the scheduler determines whether the utilization of the allocated capacity for this scheduling interval is below the lowerAllocUtil. If so, then operation advances to block 713 where the scheduler decreases the allocated capacity by the defined gain amount, but not below the defined minResource allocation amount, for the next scheduling interval. Then, in block 714, the scheduler measures the utilization of the allocated capacity by the consumer during the next scheduling interval, and operation returns to block 706.

If in block 712, the scheduler determines that the utilization of the allocated capacity for the scheduling interval is not below lowerAllocUtil, the operation advances to block 715 where the scheduler does not change the allocated capacity for the next scheduling interval, and the scheduler again measures the utilization of the allocated capacity by the consumer during the next scheduling interval. Operation then returns to block 706, and the process continues so on.

To illustrate an exemplary application of one embodiment, consider the following case study. In the exemplary case study, the same $Q^D$ metric was achieved by scheduler employing the above-described fast allocation policy with 3 times small minCPU allocation parameter setting. Thus, application of an embodiment of the present invention for a scheduler in this exemplary case study enabled potential assigning more than 3 times as many workloads to the server.

The exemplary case study is intended solely as an example and is not intended to limit the scope of the concepts presented herein. For this study, we obtained a trace of CPU demands for a file server from a software development environment that is to be hosted in a resource pool. This is the "reference system" for our case study. The trace was recorded over 140 days and includes a measurement of CPU utilization every 15 seconds. The file server had fixed access to 3 CPUs and was not governed by a workload manager.

Let us consider three workload quality of service scenarios: high, medium, and low. These three quality of service scenarios correspond to utilization of allocation ranges (lowerAllocUtil, upperAllocUtil) of (0.233, 0.433), (0.4, 0.6), and (0.566, 0.766), with mean utilization of allocation goals of 0.333, 0.5, and 0.666, respectively. Let the QoS targets for each of the services be defined as $Q^D$=80%.

Figure 8A:
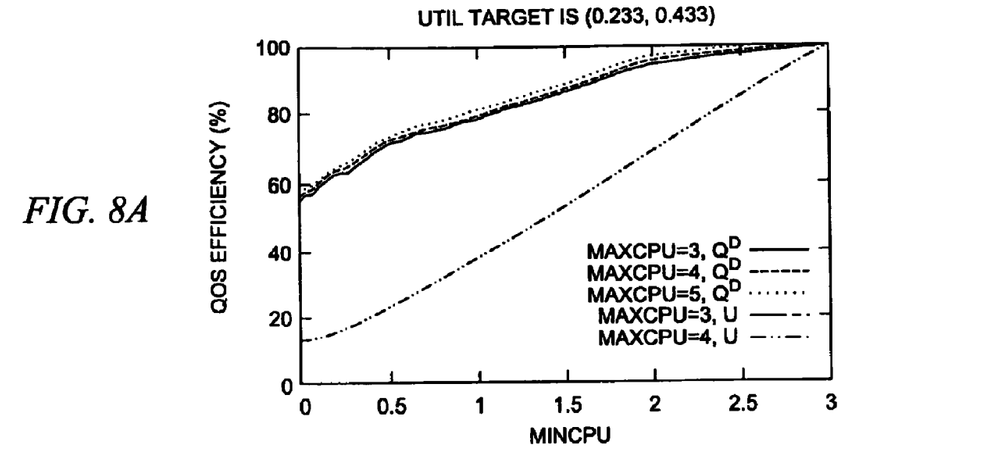
FIGS. 8A-8C show the impact of minCPU allocation and maxCPU allocation parameters on a quality of service metric for the high, medium, and low quality of service scenarios, respectively, for an exemplary case study.
Figure 8B:
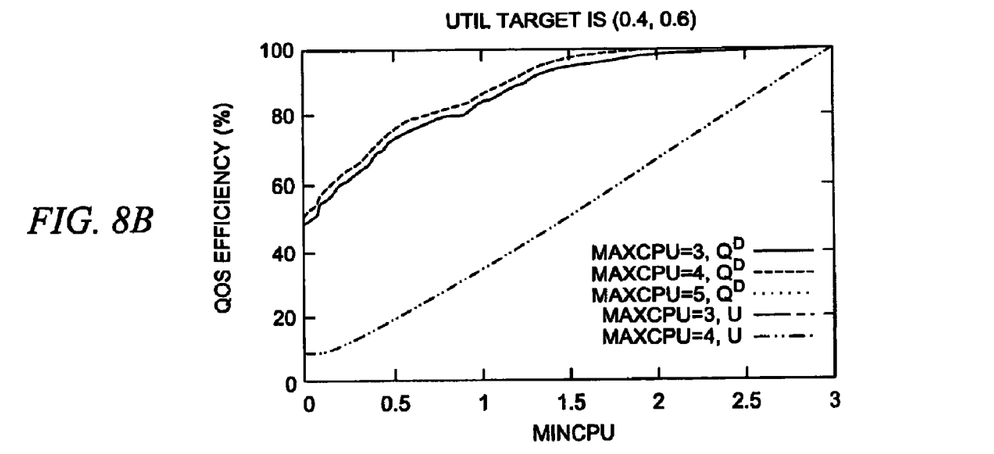
Figure 8C:
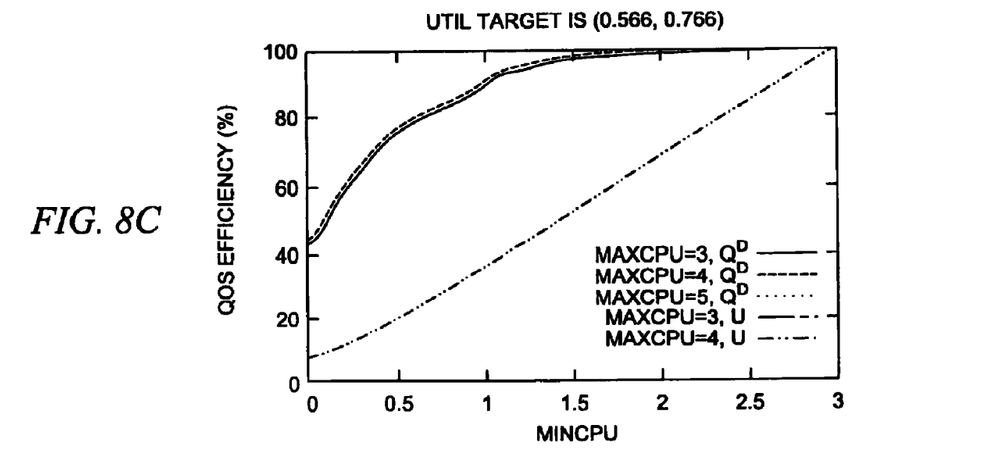

FIGS. 8A-8C show the impact of minCPU allocation and maxCPU allocation parameters on the $Q^D$ metric for the high, medium, and low quality of service scenarios, respectively, for this exemplary case study. That is, FIGS. 8A-8C show $Q^D$ metric for a given workload and original workload manager controller with respect to different values of minCPU and maxCPU parameters (we limit maxCPU<5). As a result, in order to support $Q^D$=80% while minimizing CPU usage in this exemplary case study the parameters settings are:

for high QoS service, minCPU=0.9 and maxCPU=5;
for medium QoS service, minCPU=0.65 and maxCPU=4; and
for low QoS service, minCPU=0.65 and maxCPU=4.

Figure 9A:
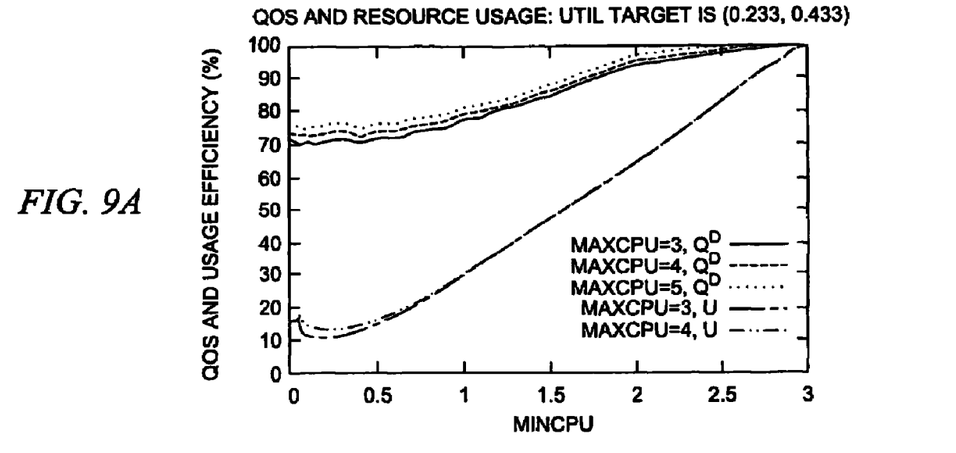
FIGS. 9A-9C show the relationship between minCPU and maxCPU with various quality of service metrics for a given workload and a scheduler employing an embodiment of the present invention with respect to the high, medium, and low QoS scenarios, respectively, for the exemplary case study.
Figure 9B:
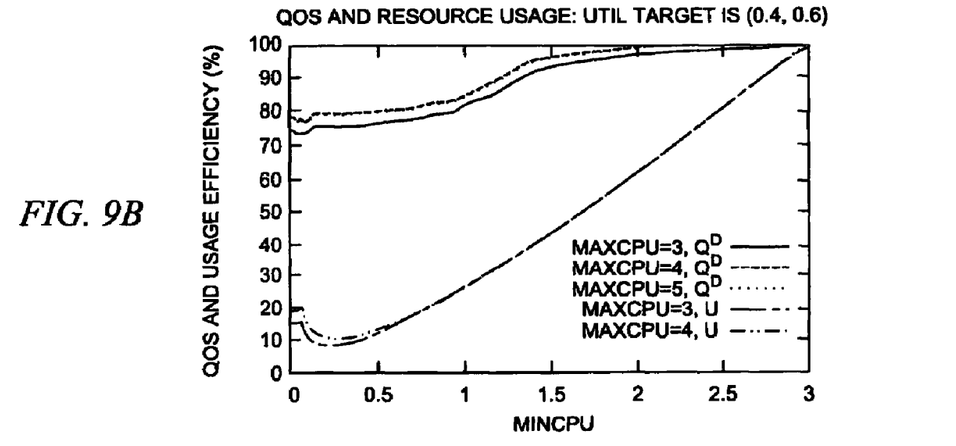
Figure 9C:
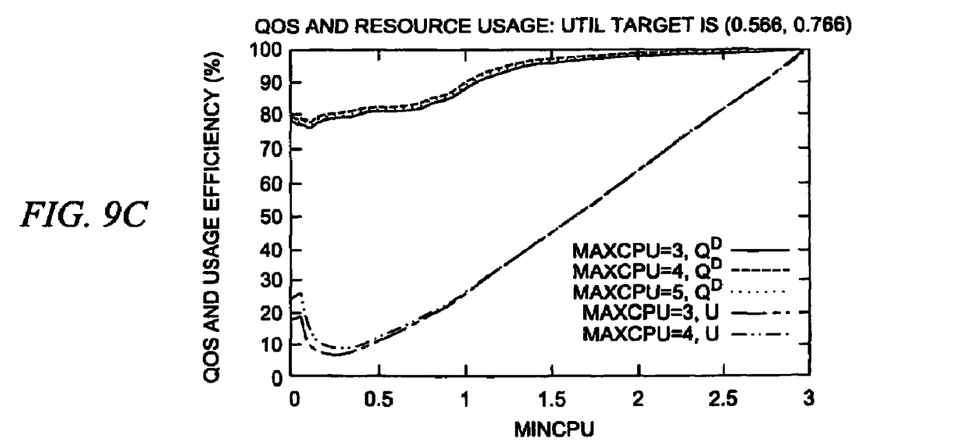

FIGS. 9A-9C show the relationship between minCPU and maxCPU with $Q^D$, $Q^P$ and $S^P$ for a given workload and a scheduler employing the above-described fast allocation policy with respect to the high, medium, and low QoS scenarios, respectively, for the exemplary case study. FIG. 9A shows that under the fast allocation policy, even as minCPU approaches zero, i.e. minCPU=0.01, $Q^D$ values remain near 75%. For the original workload manager algorithm the $Q^D$ value approaches 55% for minCPU=0.01. Even greater improvements for $Q^P$ are achieved for the medium and low QoS scenarios, as shown in FIGS. 9B-9C.

Though one may be tempted to exploit the low minCPU values when using the fast allocation policy, FIGS. 9A-9C show that very low values of minCPU have an adverse impact on usage efficiency U. FIGS. 9A-9C show the relationship between minCPU and utilization efficiency U for the high, medium, and low QoS scenarios, respectively, for the exemplary case study. In each of FIGS. 9A-9C, as minCPU goes below approximately 0.2, the U value begins to increase, reflecting the decrease in usage efficiency periodically caused by quickly changing the allocation to maxCPU value.

Thus, under the fast allocation policy, in order to support $Q^D$=80% while minimizing CPU usage for this exemplary case study, the parameters settings are:

for high QoS service, minCPU=0.85 and maxCPU=5;
for medium QoS service, minCPU=0.2 and maxCPU=4; and
for low QoS service, minCPU=0.2 and maxCPU=4.

Accordingly, with the fast allocation policy, for medium and low QoS services, the scheduler is able to achieve the same $Q^D$ metric with 3 times smaller minCPU parameter setting, i.e., we can potentially assign more than 3 times as many workloads to the server, for this exemplary case study. Thus, this exemplary case study illustrates potential benefits of employing the above-described fast allocation policy for a scheduler, particularly when servicing a bursty workload.

In view of the above, embodiments of the present invention provide an improved scheduling scheme, such the exemplary above-described fast allocation policy, for a workload manager that can help to increase the number of workloads that can be assigned to a pool without sacrificing application workload quality of service or the efficiency of the resource pool.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 10:
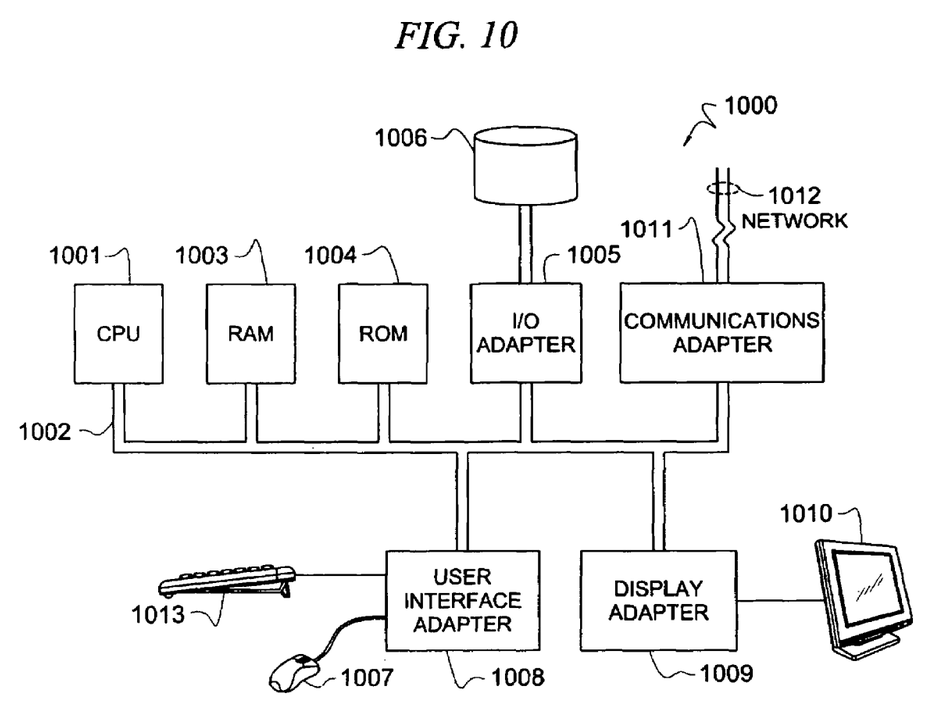
FIG. 10 shows an exemplary system on which the workload manager may be implemented according to one embodiment of the present invention.

FIG. 10 illustrates an exemplary computer system 1000 on which the workload manager 11 and/or scheduler control algorithm 101 may be implemented according to one embodiment of the present invention. Central processing unit (CPU) 1001 is coupled to system bus 1002. CPU 1001 may be any general-purpose CPU. The present invention is not restricted by the architecture of CPU 1001 (or other components of exemplary system 1000) as long as CPU 1001 (and other components of system 1000) supports the inventive operations as described herein. CPU 1001 may execute the various logical instructions according to embodiments of the present invention. For example, CPU 1001 may execute machine-level instructions according to the exemplary operational flows described above in conjunction with FIGS. 2 and 7.

Computer system 1000 also preferably includes random access memory (RAM) 1003, which may be SRAM, DRAM, SDRAM, or the like. Computer system 1000 preferably includes read-only memory (ROM) 1004 which may be PROM, EPROM, EEPROM, or the like. RAM 1003 and ROM 1004 hold user and system data and programs, as is well known in the art.

Computer system 1000 also preferably includes input/output (I/O) adapter 1005, communications adapter 1011, user interface adapter 1008, and display adapter 1009. I/O adapter 1005, user interface adapter 1008, and/or communications adapter 1011 may, in certain embodiments, enable a user to interact with computer system 1000 in order to input information.

I/O adapter 1005 preferably connects to storage device(s) 1006, such as one or more of hard drive, compact disc (CD) drive, floppy disk drive, tape drive, etc. to computer system 1000. The storage devices may be utilized when RAM 1003 is insufficient for the memory requirements associated with storing data for operations of the workload manager 11 and/or scheduler control algorithm 101. Communications adapter 1011 is preferably adapted to couple computer system 1000 to network 1012, which may enable information to be input to and/or output from system 1000 via such network 1012 (e.g., the Internet or other wide-area network, a local-area network, a public or private switched telephony network, a wireless network, any combination of the foregoing). For instance, a representative workload 12 may be input to system 1000 via network 1012 from a remote computer. User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010 to display information according to certain embodiments of the present invention.

It shall be appreciated that the present invention is not limited to the architecture of system 1000. For example, any suitable processor-based device may be utilized for implementing workload manager 11 and/or scheduler control algorithm 101, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
defining a maximum allocation of capacity of a shared resource to a consumer for a scheduling interval;
measuring utilization of an allocated capacity of the shared resource by the consumer for a given scheduling interval, wherein the allocated capacity is less than the maximum allocation of capacity;
when the allocated capacity of the shared resource is completely utilized by the consumer during the given scheduling interval, the allocated capacity of the shared resource is increased by a scheduler to the defined maximum allocation for the consumer for a next scheduling interval in one increment; and
when the allocated capacity of the shared resource is not completely utilized by the consumer during the given scheduling interval but exceeds a threshold, the allocated capacity of the shared resource is increased by the scheduler by a defined gain amount for the next scheduling interval.

2. The method of claim 1 comprising:
performing said measuring utilization for every scheduling interval; and
when the allocated capacity of the shared resource is completely utilized by the consumer during any scheduling interval, increasing, by the scheduler, the allocated capacity of the shared resource to the defined maximum allocation for the consumer for a next scheduling interval.

3. The method of claim 1 wherein the shared resource comprises a central processing unit (CPU).

4. The method of claim 1 wherein the consumer comprises an application.

5. The method of claim 1 wherein the scheduler comprises a proportional-share scheduler.

6. The method of claim 1 further comprising:
defining the threshold as an upperAllocUtil threshold parameter that triggers an increase of allocation of capacity of the shared resource to the consumer when utilization of the shared resource by the consumer during a scheduling interval exceeds the upperAllocUtil threshold parameter; and
defining the gain amount that specifies an amount of capacity allocation of the shared resource.

7. The method of claim 6 further comprising:
defining a lowerAllocUtil threshold parameter that triggers a decrease of allocation of capacity of the shared resource to the consumer when utilization of the shared resource by the consumer during a scheduling interval is below the lowerAllocUtil threshold parameter;
determining whether the measured utilization of the allocated capacity of the shared resource by the consumer during the given scheduling interval is below the lowerAllocUtil threshold parameter; and
when determined that the measured utilization of the allocated capacity of the shared resource by the consumer during the given scheduling interval is below the lowerAllocUtil threshold parameter, decreasing, by the scheduler, the allocated capacity of the shared resource to the consumer for the next scheduling interval by the defined gain amount.

8. The method of claim 7 further comprising:
defining a minimum allocation of capacity of the shared resource to the consumer for a scheduling interval; and
wherein the decreasing of the allocated capacity of the shared resource by the scheduler does not decrease the allocated capacity of the shared resource below the defined minimum allocation.

9. Computer-executable software code stored to a non-transitory computer-readable medium, the computer-executable software code when executed by a processor performs a method comprising:
determining an amount of utilization of an allocated capacity of a shared resource by a consumer during a given scheduling interval, wherein the allocated capacity is less than a predefined maximum allocation amount;
responsive to the allocated capacity of the shared resource being completely utilized by the consumer during the given scheduling interval, increasing the allocated capacity of the shared resource to the predefined maximum allocation amount for the consumer for a next scheduling interval in one increment; and
responsive to the allocated capacity of the shared resource not being completely utilized by the consumer during the given scheduling interval but exceeding a threshold, to increase the allocated capacity of the shared resource to the consumer for the next scheduling interval by a predefined gain amount.

10. The computer-executable software code of claim 9 further comprising:
measuring the amount of utilization of the allocated capacity of the shared resource by the consumer during the given scheduling interval.

11. The computer-executable software code of claim 9 further comprising:
performing said determining for every scheduling interval; and
responsive to the allocated capacity of the shared resource being completely utilized by the consumer during any scheduling interval, increasing the allocated capacity of the shared resource to the predefined maximum allocation for the consumer for a next scheduling interval.

12. The computer-executable software code of claim 9 wherein the shared resource comprises a central processing unit (CPU).

13. The computer-executable software code of claim 9 wherein the consumer comprises an application.

14. The computer-executable software code of claim 9 further comprising:
   determining whether the amount of utilization of the allocated capacity of the shared resource by the consumer during the given scheduling interval exceeds the threshold, the threshold being an upperAllocUtil threshold; and
   responsive to determining that the allocated capacity of the shared resource is not completely utilized by the consumer during the given scheduling interval but the amount utilization of the allocated capacity of the shared resource by the consumer during the given scheduling interval exceeds the upperAllocUtil threshold, increasing the allocated capacity of the shared resource to the consumer for the next scheduling interval by the predefined gain amount so the allocated capacity of the shared resource to the consumer does not exceed the predefined maximum allocation amount.

15. The computer-executable software code of claim 14 further comprising:
   determining whether the amount of utilization of the allocated capacity of the shared resource by the consumer during the given scheduling interval is below a predefined lowerAllocUtil threshold; and
   responsive to determining that the amount of utilization of the allocated capacity of the shared resource by the consumer during the given scheduling interval is below the lowerAllocUtil threshold, decreasing the allocated capacity of the shared resource to the consumer for the next scheduling interval by the predefined gain amount.

16. The computer-executable software code of claim 15 wherein decreasing the allocated capacity of the shared resource does not decrease the allocated capacity of the shared resource below a predefined minimum allocation amount.

17. A system comprising:
   a non-transitory computer-readable medium to store computer-executable software code; and
   a processor to execute the computer-executable software code, wherein the computer-executable software code when executed causes a workload manager to receive a workload comprising competing consumer demands for capacity of at least one shared computing resource;
   the workload manager, responsive to an amount of capacity of the at least one shared computing resource that is allocated to a consumer being completely utilized during a given scheduling interval, wherein the amount of capacity is less than a predefined maximum allocation amount, to increase the allocated capacity of the at least one shared resource to the predefined maximum allocation amount for the consumer for a next scheduling interval in one increment; and
   the workload manager, responsive to the amount of capacity of the at least one shared computing resource that is allocated to the consumer not being completely utilized during the given scheduling interval but exceeding a predefined threshold, to increase the allocated capacity of the at least one shared computing resource to the consumer for the next scheduling interval by a predefined gain amount.

18. The system of claim 17 wherein the at least one shared computing resource comprises a central processing unit (CPU), and wherein the competing consumer demands comprise demands of applications.

19. The system of claim 17 further comprising:
   the workload manager further operable to, responsive to the amount of capacity of the at least one shared computing resource that is allocated to the consumer not being completely utilized by the consumer during the given scheduling interval but exceeding the predefined threshold, increase the allocated capacity of the at least one shared computing resource to the consumer for the next scheduling interval by a predefined gain amount so the allocated capacity of the least one shared computing resource to the consumer does not exceed the predefined maximum allocation amount.

20. The system of claim 19 further comprising:
   the workload manager further operable to, responsive to the amount of capacity of the at least one shared computing resource that is allocated to the consumer being utilized less than a predefined lowerAllocUtil threshold during the given scheduling interval, decrease the allocated capacity of the at least one shared computing resource to the consumer for the next scheduling interval by the predefined gain amount.

* * * * *